(12) United States Patent
Koop et al.

(10) Patent No.: US 8,705,523 B2
(45) Date of Patent: Apr. 22, 2014

(54) CONJOINED CLASS-BASED NETWORKING

(75) Inventors: LaMonte Peter Koop, Alpharetta, GA (US); David S. Robins, Buffalo Grove, IL (US)

(73) Assignee: Google Inc., Mountain View, CA (US)

(*) Notice: Subject to any disclaimer, the term of this patent is extended or adjusted under 35 U.S.C. 154(b) by 968 days.

(21) Appl. No.: 12/767,561

(22) Filed: Apr. 26, 2010

(65) Prior Publication Data

US 2010/0265042 A1   Oct. 21, 2010

Related U.S. Application Data

(63) Continuation of application No. 12/701,451, filed on Feb. 5, 2010, now abandoned, which is a continuation-in-part of application No. 12/608,837, filed on Oct. 29, 2009, now Pat. No. 8,462,662, and a continuation-in-part of application No. 12/609,009, filed on Oct. 29, 2009, now Pat. No. 8,275,404, and a continuation-in-part of application No. 12/607,040, filed on Oct. 27, 2009, now Pat. No. 8,315,237.

(60) Provisional application No. 61/150,298, filed on Feb. 5, 2009.

(51) Int. Cl.
*H04L 12/28* (2006.01)
*H04J 1/16* (2006.01)

(52) U.S. Cl.
USPC ........... 370/389; 370/252; 370/238; 370/329; 370/255

(58) Field of Classification Search
USPC .......................... 370/252, 238, 255, 389, 329
See application file for complete search history.

(56) References Cited

U.S. PATENT DOCUMENTS

| | | | |
|---|---|---|---|
| 3,693,155 A * | 9/1972 | Crafton et al. | 340/2.81 |
| 3,805,265 A | 4/1974 | Lester | |
| 4,275,385 A | 6/1981 | White | |
| 4,446,454 A | 5/1984 | Pyle | |
| 4,613,990 A | 9/1986 | Halpern | |
| 4,680,583 A | 7/1987 | Grover | |
| 4,688,244 A | 8/1987 | Hannon et al. | |
| 4,750,197 A | 6/1988 | Denekamp et al. | |
| 4,817,537 A | 4/1989 | Cripe et al. | |
| 5,040,238 A | 8/1991 | Comroe et al. | |
| 5,054,052 A | 10/1991 | Nonami | |

(Continued)

FOREIGN PATENT DOCUMENTS

| | | |
|---|---|---|
| EP | 0467036 | 1/1992 |
| EP | 0748083 | 12/1996 |

(Continued)

OTHER PUBLICATIONS

U.S. Appl. No. 60/444,029, of Nageli, filed Jan. 31, 2003.

(Continued)

*Primary Examiner* — John Pezzlo
(74) *Attorney, Agent, or Firm* — Tillman Wright, PLLC; Chad D. Tillman; Jeremy C. Doerre

(57) ABSTRACT

A data communication network includes two logically distinct class-based networks conjoined by at least one common node that has membership in each of the respective classes of the two logically distinct class-based networks. Optionally, three or more class-based networks may be conjoined to form a data communications network.

17 Claims, 8 Drawing Sheets

(56) References Cited

U.S. PATENT DOCUMENTS

| | | |
|---|---|---|
| 5,117,501 A | 5/1992 | Childress et al. |
| 5,129,096 A | 7/1992 | Burns |
| 5,206,903 A | 4/1993 | Kohler et al. |
| 5,210,540 A | 5/1993 | Masumoto |
| 5,265,025 A | 11/1993 | Hirata |
| 5,295,154 A | 3/1994 | Meier et al. |
| 5,331,637 A | 7/1994 | Francis et al. |
| 5,369,784 A | 11/1994 | Nelson |
| 5,400,254 A | 3/1995 | Fujita |
| 5,425,051 A | 6/1995 | Mahany |
| 5,442,758 A | 8/1995 | Slingwine et al. |
| 5,461,390 A | 10/1995 | Hoshen |
| 5,511,232 A | 4/1996 | O'Dea et al. |
| 5,515,270 A | 5/1996 | Weinblatt |
| 5,543,778 A | 8/1996 | Stouffer |
| 5,550,547 A | 8/1996 | Chan et al. |
| 5,555,376 A | 9/1996 | Theimer et al. |
| 5,558,013 A | 9/1996 | Blackstone |
| 5,565,858 A | 10/1996 | Guthrie |
| 5,579,306 A | 11/1996 | Dent |
| 5,590,409 A | 12/1996 | Sawahashi et al. |
| 5,596,652 A | 1/1997 | Piatek et al. |
| 5,604,892 A | 2/1997 | Nuttall et al. |
| 5,606,313 A | 2/1997 | Allen et al. |
| 5,640,151 A | 6/1997 | Reis et al. |
| 5,652,751 A | 7/1997 | Sharony |
| 5,682,379 A | 10/1997 | Mahany et al. |
| 5,686,902 A | 11/1997 | Reis et al. |
| 5,732,007 A | 3/1998 | Grushin et al. |
| 5,761,195 A | 6/1998 | Lu et al. |
| 5,790,946 A | 8/1998 | Rotzoll |
| 5,793,882 A | 8/1998 | Piatek et al. |
| 5,833,910 A | 11/1998 | Teixido |
| 5,850,187 A | 12/1998 | Carrender et al. |
| 5,862,803 A | 1/1999 | Besson |
| 5,890,054 A | 3/1999 | Logsdon et al. |
| 5,892,441 A | 4/1999 | Woolley |
| 5,907,491 A | 5/1999 | Canada |
| 5,917,423 A | 6/1999 | Duvall |
| 5,917,433 A | 6/1999 | Keillor et al. |
| 5,939,982 A | 8/1999 | Gagnon et al. |
| 5,943,610 A | 8/1999 | Endo |
| 5,950,124 A | 9/1999 | Trompower et al. |
| 5,950,133 A | 9/1999 | Bledsoe |
| 5,959,568 A | 9/1999 | Woolley |
| 5,974,236 A | 10/1999 | Sherman |
| 5,977,913 A | 11/1999 | Christ |
| 6,005,884 A | 12/1999 | Cook et al. |
| 6,006,100 A | 12/1999 | Koenck et al. |
| 6,058,374 A | 5/2000 | Guthrie et al. |
| 6,072,784 A | 6/2000 | Agrawal et al. |
| 6,078,789 A | 6/2000 | Bodenmann et al. |
| 6,084,512 A | 7/2000 | Elberty et al. |
| 6,091,724 A | 7/2000 | Chandra et al. |
| 6,097,707 A | 8/2000 | Hodzic et al. |
| 6,104,512 A | 8/2000 | Batey, Jr. et al. |
| 6,118,988 A | 9/2000 | Choi |
| 6,125,306 A | 9/2000 | Shimada et al. |
| 6,127,928 A | 10/2000 | Issacman |
| 6,127,976 A | 10/2000 | Boyd et al. |
| 6,134,587 A | 10/2000 | Okanoue |
| 6,192,400 B1 | 2/2001 | Hanson et al. |
| 6,198,913 B1 | 3/2001 | Sung et al. |
| 6,201,974 B1 | 3/2001 | Lietsalmi et al. |
| 6,246,882 B1 | 6/2001 | Lachance |
| 6,256,303 B1 | 7/2001 | Drakoulis et al. |
| 6,285,295 B1 | 9/2001 | Casden |
| 6,313,745 B1 | 11/2001 | Suzuki |
| 6,354,493 B1 | 3/2002 | Mon |
| 6,360,169 B1 | 3/2002 | Dudaney |
| 6,381,467 B1 | 4/2002 | Hill et al. |
| 6,404,082 B1 | 6/2002 | Rasinski et al. |
| 6,405,102 B1 | 6/2002 | Swartz et al. |
| 6,409,082 B1 | 6/2002 | Davis et al. |
| 6,418,299 B1 | 7/2002 | Ramanathan |
| 6,424,260 B2 | 7/2002 | Maloney |
| 6,424,264 B1 | 7/2002 | Giraldin et al. |
| 6,427,913 B1 | 8/2002 | Maloney |
| 6,437,692 B1 | 8/2002 | Petite et al. |
| 6,473,607 B1 | 10/2002 | Shohara et al. |
| 6,476,708 B1 | 11/2002 | Johnson |
| 6,512,455 B2 | 1/2003 | Finn et al. |
| 6,512,478 B1 | 1/2003 | Chien |
| 6,529,142 B2 | 3/2003 | Yeh et al. |
| 6,542,114 B1 | 4/2003 | Eagleson et al. |
| 6,547,137 B1 | 4/2003 | Begelfer et al. |
| 6,559,620 B2 | 5/2003 | Zhou et al. |
| 6,587,755 B1 | 7/2003 | Smith et al. |
| 6,594,468 B1 | 7/2003 | Ramanathan |
| 6,600,418 B2 | 7/2003 | Francis et al. |
| 6,611,556 B1 | 8/2003 | Koener et al. |
| 6,614,349 B1 | 9/2003 | Proctor et al. |
| 6,617,962 B1 | 9/2003 | Horwitz et al. |
| 6,630,885 B2 | 10/2003 | Hardman et al. |
| 6,665,585 B2 | 12/2003 | Kawase |
| 6,674,364 B1 | 1/2004 | Holbrook et al. |
| 6,677,852 B1 | 1/2004 | Landt |
| 6,680,920 B1 | 1/2004 | Wan |
| 6,700,533 B1 | 3/2004 | Werb et al. |
| 6,701,215 B1 | 3/2004 | Stademann |
| 6,720,888 B2 | 4/2004 | Eagleson et al. |
| 6,737,974 B2 | 5/2004 | Dickinson |
| 6,745,027 B2 | 6/2004 | Twitchell |
| 6,747,562 B2 | 6/2004 | Giraldin et al. |
| 6,751,200 B1 | 6/2004 | Larsson et al. |
| 6,753,775 B2 | 6/2004 | Auerbach et al. |
| 6,760,578 B2 | 7/2004 | Rotzoll |
| 6,761,312 B2 | 7/2004 | Piatek et al. |
| 6,765,484 B2 | 7/2004 | Eagleson et al. |
| 6,816,063 B2 | 11/2004 | Kubler et al. |
| 6,826,625 B1 | 11/2004 | Fujise et al. |
| 6,847,892 B2 | 1/2005 | Zhou et al. |
| 6,919,803 B2 | 7/2005 | Breed |
| 6,927,688 B2 | 8/2005 | Tice |
| 6,940,392 B2 | 9/2005 | Chan et al. |
| 6,975,614 B2 | 12/2005 | Kennedy |
| 7,005,968 B1 | 2/2006 | Bridgelall |
| 7,012,529 B2 | 3/2006 | Sajkowsky |
| 7,027,773 B1 | 4/2006 | McMillin |
| 7,084,740 B2 | 8/2006 | Bridgelall |
| 7,088,229 B2 | 8/2006 | Johnson |
| 7,098,784 B2 | 8/2006 | Easley et al. |
| 7,103,344 B2 | 9/2006 | Menard |
| 7,126,470 B2 | 10/2006 | Clift et al. |
| 7,137,003 B2 | 11/2006 | Krishnan et al. |
| 7,142,121 B2 | 11/2006 | Chan et al. |
| 7,191,934 B2 | 3/2007 | Miller et al. |
| 7,196,622 B2 | 3/2007 | Lambright et al. |
| 7,200,132 B2 | 4/2007 | Twitchell |
| 7,209,468 B2 | 4/2007 | Twitchell |
| 7,212,122 B2 | 5/2007 | Gloekler et al. |
| 7,221,668 B2 | 5/2007 | Twitchell |
| 7,230,933 B2 | 6/2007 | Bahl et al. |
| 7,233,958 B2 | 6/2007 | Weng |
| 7,251,233 B2 | 7/2007 | Wood |
| 7,253,731 B2 | 8/2007 | Joao |
| 7,274,295 B2 | 9/2007 | Koch |
| 7,282,944 B2 | 10/2007 | Gunn et al. |
| 7,317,382 B2 | 1/2008 | Pratt |
| 7,319,397 B2 | 1/2008 | Chung |
| 7,323,981 B2 | 1/2008 | Peel |
| 7,330,736 B2 | 2/2008 | Redi |
| 7,340,260 B2 | 3/2008 | McAlexander |
| 7,348,875 B2 | 3/2008 | Hughes et al. |
| 7,349,803 B2 | 3/2008 | Belenkii et al. |
| 7,349,804 B2 | 3/2008 | Belenkii et al. |
| 7,369,047 B2 | 5/2008 | Broad |
| 7,369,074 B2 | 5/2008 | Miyata et al. |
| 7,376,507 B1 | 5/2008 | Daily et al. |
| 7,394,372 B2 | 7/2008 | Gloekler et al. |
| 7,397,363 B2 | 7/2008 | Joao |
| 7,419,101 B2 | 9/2008 | Kawai |
| 7,430,437 B2 | 9/2008 | Twitchell |
| 7,440,781 B2 | 10/2008 | Beach et al. |

(56) References Cited

U.S. PATENT DOCUMENTS

| | | |
|---|---|---|
| 7,482,920 B2 | 1/2009 | Joao |
| 7,489,244 B2 | 2/2009 | August et al. |
| 7,489,245 B2 | 2/2009 | August et al. |
| 7,522,568 B2 | 4/2009 | Twitchell |
| 7,536,188 B1 | 5/2009 | Fegan et al. |
| 7,552,169 B2 | 6/2009 | Huang et al. |
| 7,561,533 B2 | 7/2009 | Aklepi et al. |
| 7,589,616 B2 | 9/2009 | Klatsmanyi et al. |
| 7,613,484 B2 | 11/2009 | Lappetelainen et al. |
| 7,733,818 B2 | 6/2010 | Twitchell |
| 7,742,745 B2 | 6/2010 | Twitchell |
| 7,746,838 B2 | 6/2010 | Twitchell |
| 7,830,850 B2 | 11/2010 | Twitchell |
| 7,830,852 B2 | 11/2010 | Twitchell |
| 7,940,717 B2 | 5/2011 | Twitchell |
| 7,940,719 B2 | 5/2011 | Twitchell |
| 7,940,736 B2 | 5/2011 | Twitchell |
| 7,941,095 B2 | 5/2011 | Twitchell |
| 2001/0000019 A1 | 3/2001 | Bowers et al. |
| 2001/0050550 A1 | 12/2001 | Yoshida et al. |
| 2002/0030596 A1 | 3/2002 | Finn et al. |
| 2002/0039896 A1 | 4/2002 | Brown |
| 2002/0050932 A1 | 5/2002 | Rhoades et al. |
| 2002/0073648 A1 | 6/2002 | Sevcik et al. |
| 2002/0089434 A1 | 7/2002 | Ghazarian |
| 2002/0098861 A1 | 7/2002 | Doney et al. |
| 2002/0099567 A1 | 7/2002 | Joao |
| 2002/0146985 A1 | 10/2002 | Naden |
| 2002/0149483 A1 | 10/2002 | Shanks et al. |
| 2002/0170961 A1 | 11/2002 | Dickson et al. |
| 2003/0001743 A1 | 1/2003 | Menard |
| 2003/0008692 A1 | 1/2003 | Phelan |
| 2003/0019929 A1 | 1/2003 | Stewart |
| 2003/0083064 A1 | 5/2003 | Cooper |
| 2003/0141973 A1 | 7/2003 | Yeh et al. |
| 2003/0144020 A1 | 7/2003 | Challa et al. |
| 2003/0179073 A1 | 9/2003 | Ghazarian |
| 2003/0182077 A1 | 9/2003 | Emord |
| 2003/0209601 A1 | 11/2003 | Chung |
| 2003/0236077 A1 | 12/2003 | Sivard |
| 2004/0021572 A1 | 2/2004 | Schoen et al. |
| 2004/0041706 A1 | 3/2004 | Stratmoen |
| 2004/0041731 A1 | 3/2004 | Hisano |
| 2004/0100394 A1 | 5/2004 | Hitt |
| 2004/0100415 A1 | 5/2004 | Veitch et al. |
| 2004/0109429 A1 | 6/2004 | Carter et al. |
| 2004/0119588 A1 | 6/2004 | Marks |
| 2004/0121793 A1 | 6/2004 | Weigele et al. |
| 2004/0135691 A1 | 7/2004 | Duron et al. |
| 2004/0183673 A1 | 9/2004 | Nageli |
| 2004/0232924 A1 | 11/2004 | Hilleary et al. |
| 2004/0233041 A1 | 11/2004 | Bohman et al. |
| 2004/0233054 A1 | 11/2004 | Neff et al. |
| 2004/0246463 A1 | 12/2004 | Milinusic |
| 2005/0043068 A1 | 2/2005 | Shohara et al. |
| 2005/0073406 A1 | 4/2005 | Easley et al. |
| 2005/0087235 A1 | 4/2005 | Skorpik |
| 2005/0088299 A1 | 4/2005 | Bandy et al. |
| 2005/0090211 A1 | 4/2005 | Lilja et al. |
| 2005/0114326 A1 | 5/2005 | Smith |
| 2005/0128080 A1 | 6/2005 | Hall et al. |
| 2005/0145018 A1 | 7/2005 | Sabata et al. |
| 2005/0146445 A1 | 7/2005 | Sleboda et al. |
| 2005/0159187 A1 | 7/2005 | Mendolia et al. |
| 2005/0190759 A1 | 9/2005 | Lee |
| 2005/0199716 A1 | 9/2005 | Shafer |
| 2005/0226201 A1 | 10/2005 | McMillin |
| 2005/0261037 A1 | 11/2005 | Raghunath et al. |
| 2005/0270160 A1 | 12/2005 | Chan et al. |
| 2006/0104301 A1 | 5/2006 | Beyer et al. |
| 2006/0109106 A1 | 5/2006 | Braun |
| 2006/0114102 A1 | 6/2006 | Chang et al. |
| 2006/0135145 A1 | 6/2006 | Redi |
| 2006/0163422 A1 | 7/2006 | Krikorian et al. |
| 2006/0164232 A1 | 7/2006 | Waterhouse et al. |
| 2006/0164239 A1 | 7/2006 | Loda |
| 2006/0231611 A1 | 10/2006 | Chakiris et al. |
| 2006/0244568 A1 | 11/2006 | Tong et al. |
| 2006/0247986 A1 | 11/2006 | Joao |
| 2006/0270382 A1 | 11/2006 | Lappetelainen et al. |
| 2007/0008408 A1 | 1/2007 | Zehavi |
| 2007/0032951 A1 | 2/2007 | Tanenhaus et al. |
| 2007/0043807 A1* | 2/2007 | Twitchell, Jr. ............... 709/201 |
| 2007/0135179 A1 | 6/2007 | Hardman et al. |
| 2007/0152826 A1 | 7/2007 | August et al. |
| 2008/0234878 A1 | 9/2008 | Joao |
| 2008/0264888 A1 | 10/2008 | Zakula et al. |
| 2009/0008450 A1 | 1/2009 | Ebert et al. |
| 2009/0100167 A1 | 4/2009 | Huang et al. |
| 2009/0104902 A1 | 4/2009 | Twitchell |
| 2009/0111484 A1 | 4/2009 | Koch et al. |
| 2009/0117950 A1 | 5/2009 | Twitchell |
| 2009/0124302 A1 | 5/2009 | Twitchell |
| 2009/0135000 A1 | 5/2009 | Twitchell |
| 2009/0146805 A1 | 6/2009 | Joao |
| 2009/0161642 A1 | 6/2009 | Twitchell |
| 2009/0181623 A1 | 7/2009 | Twitchell |
| 2009/0215407 A1 | 8/2009 | Twitchell |
| 2009/0237216 A1 | 9/2009 | Twitchell |
| 2009/0267770 A1 | 10/2009 | Twitchell |
| 2009/0290512 A1 | 11/2009 | Twitchell |
| 2010/0007470 A1 | 1/2010 | Twitchell |
| 2010/0067420 A1 | 3/2010 | Twitchell |
| 2010/0121862 A1 | 5/2010 | Twitchell |
| 2010/0141401 A1 | 6/2010 | Twitchell |
| 2010/0141449 A1 | 6/2010 | Twitchell |
| 2010/0214074 A1 | 8/2010 | Twitchell |
| 2010/0219939 A1 | 9/2010 | Twitchell |
| 2010/0231381 A1 | 9/2010 | Twitchell |
| 2010/0232320 A1 | 9/2010 | Twitchell |
| 2010/0250460 A1 | 9/2010 | Twitchell |
| 2010/0330930 A1 | 12/2010 | Twitchell |
| 2011/0006882 A1 | 1/2011 | Twitchell |
| 2011/0289320 A1* | 11/2011 | Twitchell et al. ............. 713/176 |

FOREIGN PATENT DOCUMENTS

| | | |
|---|---|---|
| EP | 0748085 | 12/1996 |
| EP | 0829995 | 3/1998 |
| EP | 0944014 | 9/1999 |
| EP | 1317733 | 6/2003 |
| EP | 1692599 | 8/2006 |
| EP | 1692668 | 8/2006 |
| GB | 2308947 | 7/1997 |
| KR | 2005-0102419 | 10/2005 |
| KR | 2007-0005515 A | 1/2007 |
| WO | 0068907 | 11/2000 |
| WO | 0069186 | 11/2000 |
| WO | 03098175 | 11/2003 |

OTHER PUBLICATIONS

U.S. Appl. No. 60/499,338, of Easley et al., filed Sep. 3, 2003.

Charles E. Perkins, AD HOC Networks, Jan. 2001, Table of Contents, Chapters 1,4, and 11.

Ezio Valdevit, Cascading in Fibre Channel: How to Build a Multi-Switch Fabric, pp. 1-12.

Daniel Lihui Gu et al., C-ICAMA, A Centralized Intelligent Channel Assigned Multiple Access for Multi-Layer Ad-Hoc Wireless Networks with UAVs, 2000, 6 pages.

"Cluster Based Routing Protocol", Internet-Draft, Mingliang, Jiang et al., National University of Singapore, Jul. 1999.

Stojmenovic et al., Design Guidelines for Routing Protocols in Ad Hoc and Sensor Networks with a Realistic Physical Layer, Communications Magazine, IEEE, vol. 43, Issue 3, Mar. 2005, pp. 101-106.

Keshavarzian et al., Energy-Efficient Link Assessment in Wireless Sensor Networks, INFOCOM 2004. 23rd Annual Joint Conference of the IEEE Computer and Communications Societies, vol. 3, 2004, pp. 1751-1761.

Jaap Haartsen, Bluetooth-The Universal Radio Interface for Ad Hoc, Wireless Connectivity, Ericsson Review No. 3, pp. 110-117, 1998.

Guangyu Pei et al., A Wireless Hierarchical Routing Protocol with Group Mobility, 1998 IEEE, 5 pages.

(56) References Cited

OTHER PUBLICATIONS

Daniel Lihui Gu et al., Hierarchical Routing for Multi-Layer Ad-Hoc Wireless Networks with UAVs, 2000, 5 pages.

Gary Morgan, Miniature Tags Provide Visibility & Cohesion for an LIA Battalion Level 'Proof of Principle', Pacific NW National Laboratory, Apr. 2001, Gary.morgan@pnl.gov.

http://www/iprg/nokia.com/charliep/txt/manet/term.txt, Mobile Ad Hoc Networking Terminology, C. Perkins, Nov. 17, 1998, visited Nov. 13, 2000.

Jaap Haartsen et al., Bluetooth: Vision, Goals, and Architecture, Mobile Computing & Communications Review, vol. 1, No. 2, 1998, 8 pages.

Guangyu Pei et al., Mobility Management in Hierarchical Multi-hop Mobile Wireless Networks, 1999, 6 pages.

Ram Ramanathan et al., Hierarchically-Organized, Multihop Mobile Wireless Networks for Quality-of-Service Support, 1998, pp. 1-35.

http://www.cs.ucla.edu/NRL/wireless/PAPER/draft-ietf-manet-admrp-02.txt, Sung-Ju Lee et al., On-Demand Multicast Routing Protocol (ODMRP) for Ad Hoc Networks, Jan. 2000, visited Nov. 13, 2000.

Melodia et al., On the Interdependence of Distributed Topology Control and Geographical Routing in Ad Hoc and Sensor Networks, Selected Areas in Communications, IEEE Journal, vol. 23, Issue 3, Mar. 2005, pp. 101-106.

Ben Sommer et al., Group 4, Passive RF Tags.

Atsushi Iwata et al., Scalable Routing Strategies foe Ad Hoc Wireless Networks, IEEE Journal on Selected Areas in Communications, vol. 17, No. 8, Aug. 1999, pp. 1369-1379.

J.J. Garcia-Luna-Aceves et al., Source-Tree Routing in Wireless Networks, 1999, 10 pages.

Kevin Sharp, Physical Reality: A Second Look, Supply Chain Systems, http://www.idsystems.com/reader/1999_03/phys0399_pt2/index.htm, Helmers Publishing, Inc., Mar. 1999.

Jean-Pierre Hubaux et al., Toward Self-Organized Mobile Ad Hoc Networks: The Teminodes Project, IEEE Communications Magazine, Jan. 2001, pp. 118-124.

"Written Opinion of the International Search Authority" in Terahop Networks, Inc. et al. International Patent Application Serial No. PCT/US06/26158, dated Nov. 21, 2006, 7 pages.

Wireless Mesh Network, Wireless Mesh (Tree) Network Topology—www.afar.net. http://www.afar.net/technology/.wireless-mesh/. Accessed Mar. 8, 2011, 2 pages.

Network topology—Wikipedia, http://en.wikipedia.org/wiki/Network_topology. Accessed Mar. 8, 2011, 9 pages.

Ultra-wideband—Wikipedia, http://en.wikipedia.org/wiki/Ultra-wideband. Accessed Mar. 3, 2011, 4 pages.

Personal Area Networking—Wikipedia, http://en.wikipedia.org/wiki/Personal_Area_Networking. Accessed Mar. 3, 2011, 4 pages.

Information Disclosure Statement (IDS) Letter Regarding Common Patent Application(s), dated Nov. 30, 2011.

\* cited by examiner

CONJOINED CLASS-BASED NETWORKING

CROSS-REFERENCE TO RELATED APPLICATION

The present application is continuation patent application of, and claims priority under 35 U.S.C. §120 to, U.S. nonprovisional patent application Ser. No. 12/701,451, filed Feb. 5, 2010, now abandoned which nonprovisional patent application and any patent application publications thereof are hereby incorporated herein by reference, and which '451 application is:
(a) a U.S. continuation-in-part patent application of, and claims priority under 35 U.S.C. §120 to each of
  (i) U.S. nonprovisional patent application Ser. No. 12/608,837 filed on Oct. 29, 2009, now U.S. Pat. No. 8,462,662 which patent application and any patent application publication thereof are incorporated by reference herein,
  (ii) U.S. nonprovisional patent application Ser. No. 12/609,009 filed on Oct. 29, 2009, now U.S. Pat. No. 8,275,404 which patent application and any patent application publication thereof are incorporated by reference herein, and
  (iii) U.S. nonprovisional patent application Ser. No. 12/607,040 filed on Oct. 27, 2009; now U.S. Pat. No. 8,315,237 and
(b) a U.S. nonprovisional patent application of, and claims priority under 35 U.S.C. §119(e) to, U.S. provisional patent application Ser. No. 61/150,298, filed Feb. 5, 2009, which provisional patent application is incorporated by reference herein.

Additionally, the present application herein incorporates by reference each of: U.S. provisional patent application No. 61/109,494; U.S. provisional patent application No. 61/109,496; U.S. provisional patent application No. 61/109,500; U.S. provisional patent application No. 61/109,502; and U.S. provisional patent application No. 61/109,505; and each of the following U.S. patent application publications and U.S. patents:

| Application No. | Pat. No. | Earliest Publication No. |
| --- | --- | --- |
| 12/140,253 | — | US 2008-0303897 A1 |
| 11/930,782 | — | US 2008-0212544 A1 |
| 11/930,788 | — | US 2008-0165749 A1 |
| 11/930,797 | — | US 2008-0151850 A1 |
| 11/930,740 | — | US 2008-0150723 A1 |
| 11/930,770 | — | US 2008-0144554 A1 |
| 11/930,785 | — | US 2008-0143484 A1 |
| 11/930,736 | — | US 2008-0143483 A1 |
| 11/930,753 | — | US 2008-0142592 A1 |
| 11/306,765 | 7,394,361 | US 2008-0136624 A1 |
| 11/930,749 | — | US 2008-0130536 A1 |
| 11/930,779 | — | US 2008-0129458 A1 |
| 11/930,793 | — | US 2008-0112378 A1 |
| 11/930,761 | — | US 2008-0112377 A1 |
| 11/930,777 | — | US 2008-0111692 A1 |
| 11/847,309 | — | US 2007-0291724 A1 |
| 11/847,295 | — | US 2007-0291690 A1 |
| 11/832,998 | 7,378,959 | US 2007-0273503 A1 |
| 11/832,991 | 7,378,958 | US 2007-0268134 A1 |
| 11/832,979 | 7,378,957 | US 2007-0268126 A1 |
| 11/610,427 | — | US 2007-0159999 A1 |
| 11/618,931 | — | US 2007-0155327 A1 |
| 11/555,173 | — | US 2007-0099629 A1 |
| 11/555,164 | — | US 2007-0099628 A1 |
| 11/425,047 | — | US 2007-0069885 A1 |
| 11/465,466 | — | US 2007-0043807 A1 |
| 11/465,796 | — | US 2007-0041333 A1 |
| 11/193,300 | 7,438,334 | US 2007-0024066 A1 |
| 11/161,540 | 7,200,132 | US 2007-0004431 A1 |
| 11/424,850 | — | US 2007-0004331 A1 |
| 11/424,849 | — | US 2007-0004330 A1 |
| 11/161,550 | 7,430,437 | US 2007-0002808 A1 |
| 11/428,536 | — | US 2007-0002793 A1 |
| 11/428,535 | — | US 2007-0002792 A1 |
| 11/424,847 | — | US 2007-0001898 A1 |
| 11/423,127 | — | US 2006-0289204 A1 |
| 11/424,845 | — | US 2006-0287822 A1 |
| 11/425,040 | — | US 2006-0287008 A1 |
| 11/422,306 | — | US 2006-0282217 A1 |
| 11/422,304 | — | US 2006-0276963 A1 |
| 11/422,321 | — | US 2006-0276161 A1 |
| 11/422,329 | — | US 2006-0274698 A1 |
| 11/306,764 | 7,391,321 | US 2006-0237490 A1 |
| 11/161,542 | — | US 2006-0023679 A1 |
| 11/161,539 | 7,209,468 | US 2006-0023678 A1 |
| 11/161,545 | 7,221,668 | US 2006-0018274 A1 |
| 10/514,336 | 7,209,771 | US 2005-0215280 A1 |
| 10/987,964 | 7,155,264 | US 2005-0093703 A1 |
| 10/987,884 | 7,133,704 | US 2005-0093702 A1 |
| 10/604,032 | 6,934,540 | US 2004-0082296 A1 |
| 09/681,282 | 6,745,027 | US 2002-0119770 A1 |

Each of the foregoing patent application publications and patents is hereby incorporated herein by reference for purposes of disclosure of class-based network (CBN) technology, wake-up (WU) technology, and class-based networks that utilize such technologies (such as those of TeraHop Networks, Inc. of Alpharetta, Ga.), and systems employing such technologies including, inter alia: (1) implementations in the first responder context; (2) implementations in container tracking and monitoring context; and (3) implementations in equipment tracking and monitoring, especially rental construction equipment. It is intended that the CBN and WU technologies, and related features, improvements, and enhancements, as disclosed in these incorporated references may be utilized in combination with various embodiments and implementations of the present invention.

Additionally, patent application Ser. No. 11/460,976, and any publications thereof, including U.S. patent application publication no. US 2008-0315596 published on Dec. 25, 2008, are hereby incorporated herein by reference.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

Some conventional systems for tracking and/or monitoring assets (herein generally referred to as "asset tracking systems") utilize wireless tags that generally respond to any broadcast that is made. The wireless tags usually are passive, and the responses that the passive wireless tags make are often referred to as "chirps."

More sophisticated conventional asset tracking systems utilize semi-passive wireless tags and/or active wireless tags. A semi-passive wireless tag includes an internal power source for transmitting, and an active wireless tag includes an internal power source for both receiving and transmitting. Semi-passive and active wireless tags generally have greater capabilities than passive wireless tags due to the internal power sources. Of course, power consumption is always a concern when a wireless tag includes an internal power source, since the internal power supply limits the useful life of the wireless tag, after which time maintenance is required (e.g., replacement of the internal power source).

In improved asset tracking systems, such as disclosed in U.S. Pat. No. 6,934,540 and other of the above-incorporated patent applications and patents, a wireless tag responds to a broadcast if the broadcast includes a common designation matching a common designation of the wireless tag. Such a common designation may comprise, for example, an "asset class" associated with the wireless tag. Ad hoc networks further may be created based on such classes, which ad hoc networks are referred to as "class based" networks.

Class based networks (and common designation networks in general) are beneficial because, in such networks, a communication device, such as a wireless tag, generally only transmits a response to a broadcast if the broadcast includes a class (or common designation) that matches a class (or common designation) of that communication device. Indeed, in a communication device employing a wakeup sequence of one or more of the patent references incorporated herein by reference, such communication device does not even process a broadcast once it is determined that the broadcast fails to include a matching class of the communication device. Consequently, the internal power supply of a semi-passive or active communication device is not drained by needless processing and/or responses to broadcasts.

The present invention generally relates to wireless ad-hoc networks. A need exists for improvement in wireless network apparatus, systems, and methods. These, and other needs, are addressed by one or more aspects of the present invention.

SUMMARY OF THE INVENTION

The invention of the present application generally relates to networks, apparatus, methods and systems for determining the presence of a radio frequency communication device within a wireless data communications network, and especially for determining such presence in an ad hoc wireless data communications network in which at least some wireless data communication devices forming nodes of the network are at least periodically mobile. In this context, the present invention includes many aspects and features. Moreover, while many aspects and features relate to, and are described in, the context of asset tracking systems, the present invention is not limited to use only in asset tracking systems, as will become apparent from the following summaries and detailed descriptions of aspects, features, and one or more embodiments of the present invention. Indeed, the present invention is equally useful in remote sensor networks and the like for remote monitoring, whether such monitoring is the monitoring of assets or otherwise.

In a principal aspect of the invention of the present application, a wireless two-way RF data communication device includes: a memory having stored therein common designations of the wireless two-way RF data communication device; a receiver configured to receive radio frequency transmissions; a transmitter configured to make radio frequency transmissions; and electronic components. The electronic components are arranged and configured such that the wireless two-way RF data communication device receives and processes communications as a function of at least one of the common designations of the wireless two-way RF data communication device being in the communication. The electronic components further are arranged and configured such that each message that is received in a communication associated with a particular common designation of the RF data communication device, and for which the wireless two-way RF data communication device is not the destination recipient but, instead, is an intermediate recipient, is communicated: to another wireless two-way RF data communication device that has the same particular common designation, if such a wireless two-way RF data communication device is available; and if such a wireless two-way RF data communication device is unavailable, to another wireless two-way RF data communication device that has a common designation that is the same as a common designation stored in the memory, if such a wireless two-way RF data communication device is available.

In a feature, the two-way RF data communication device is a wireless transceiver that includes microprocessor capabilities.

In a feature, the two-way RF data communication device is a remote sensor node (RSN).

In a feature, the two-way RF data communication device is a wireless reader tag (WRT).

In a feature, the two-way RF data communication device serves as a wireless tag (WT).

In a feature, the common designations stored in the memory are class designations for use in class-based networks.

In a feature, the electronic components are arranged and configured such that the wireless two-way RF data communication device receives and processes only communications that include at least one of the common designations of the wireless two-way RF data communication device.

In a feature, the electronic components are arranged and configured such that the communications provided, if such a wireless two-way RF data communication device is unavailable, to another wireless two-way RF data communication device that has a common designation that is the same as a common designation stored in the memory (if such a wireless two-way RF data communication device is available) are performed only for predetermined common designations and not for all common designations.

In a feature, the electronic components are arranged and configured such that the wireless two-way RF data communication device selectively operates between at least a first state, in which the communications provided if such a wireless two-way RF data communication device is unavailable, to another wireless two-way RF data communication device that has a common designation that is the same as a common designation stored in the memory (if such a wireless two-way RF data communication device is available) are enabled, and in a second state, in which the communications are disabled.

In another principal aspect of the invention of the present application, a data communications network includes a plurality of wireless two-way radio frequency (RF) data communication devices, each wireless two-way RF data communication device forming a node of the data communications network and each wireless two-way RF data communication device including a memory having stored therein a common designation. Furthermore, at least one of the wireless two-way RF data communication devices further includes a second common designation stored in the memory thereof. The at least one of the wireless two-way RF data communication devices further comprises a receiver configured to receive radio frequency transmissions; a transmitter configured to make radio frequency transmissions, and electronic components. The electronic components are arranged and configured such that the wireless two-way RF data communication device receives and processes communications as a function of at least one of the common designations of the wireless two-way RF data communication device being in the communication. The electronic components are further arranged and configured such that each message that is received in a communication associated with a particular common designation of the RF data communication device, and for which the wireless two-way RF data communication device is not the destination recipient but, instead, is an intermediate recipient, is communicated: to another wireless two-way RF data communication device that has the same particular common designation, if such a wireless two-way RF data communication device is available; and if such a wireless two-way RF data communication device is unavailable, to another wireless two-way RF data communication device that has a common designation that is the same as a common designation stored in the memory, if such a wireless two-way RF data communication device is available.

In a feature, the first and second common designations stored in the memory of the at least one of the wireless two-way RF data communication devices are class designations for use in class-based networking.

In a feature, the electronic components of the at least one of the wireless two-way RF data communication devices are arranged and configured such that the communications provided, if such a wireless two-way RF data communication device is unavailable, to another wireless two-way RF data communication device that has a common designation that is the same as a common designation stored in the memory (if such a wireless two-way RF data communication device is available) are performed only for predetermined common designations and not for all common designations. Moreover, the electronic components of the at least one of the wireless two-way RF data communication devices may be arranged and configured such that the wireless two-way RF data communication device selectively operates between at least a first state, in which the aforementioned provided communications are enabled, and in a second state, in which the aforementioned provided communications are disabled.

In a feature, each node of the data communications network comprises a wireless radio-frequency data communication device having a transmitter and a receiver that collectively receive and transmit information wirelessly.

In a feature, each wireless two-way RF data communication device comprises a standards-based data packet radio component that includes both said receiver and said transmitter of the respective wireless two-way RF data communication device.

In a feature, the information is wirelessly communicated in data packets in the data communications network.

In a feature, a plurality of the wireless two-way RF data communication devices are respectively attached to assets for monitoring and tracking of the asset.

In a feature, a plurality of the wireless two-way RF data communication devices are permanently affixed to a structure for monitoring and/or tracking assets that come within a proximity thereto.

In a feature, a plurality of the wireless two-way RF data communication devices each comprises a wireless transceiver that includes microprocessor capabilities.

In another principal aspect of the invention of the present application, and with respect to the context of a data network comprising a plurality of wireless two-way radio frequency (RF) data communication devices, each wireless two-way RF data communication device forming a node of the data communications network, a method of communicating a message from an originating node to a destination node by way of intermediate nodes includes the steps of: maintaining multiple class designations in memory of a particular one of the wireless two-way radio frequency (RF) data communication devices forming a node of the network; and for each message that is received by the particular wireless two-way radio frequency (RF) data communication device in a communication associated with a common designation of the particular wireless two-way radio frequency (RF) data communication device, and for which the particular wireless two-way RF data communication device is an intermediate node with respect to the message, forwarding the message: (a) to another node of the network that has the same particular common designation associated with the message, if such another node is available; and (b) if such another node is unavailable, to another node that has a common designation that is the same as a common designation stored in the memory of the particular wireless two-way radio frequency (RF) data communication device, if such a node is available.

In a feature, the particular wireless two-way radio frequency (RF) data communication device receives and processes communications as a function of at least one of the common designations of the particular wireless two-way RF data communication device being in the communication.

In a feature, the first and second common designations stored in the memory of the particular wireless two-way RF data communication device are class designations for use in class-based networking, the particular wireless two-way RF data communication device conjoining at least two logically distinct class-based networks.

In a feature, communicating the message to another node that has a common designation that is the same as a common designation stored in the memory of the particular wireless two-way radio frequency (RF) data communication device, but that is not the same as the common designation associated with the communication of the message that is received, is performed only for predetermined common designations and not for all common designations.

In a feature, the method further includes switching between at least two states of operation by the particular wireless two-way RF data communication device, wherein said step (b)(ii) is not performed in the second state. The switching may be in response to a command that is received by the particular wireless two-way RF data communication device in a wireless communication; in response to a sensed condition; may be performed at predetermined times; or any combination of the foregoing Another principal aspect of the invention of the present application comprises a conjoined common designation network and may be a class-based network.

Another principal aspect of the invention of the present application comprises a method for conjoined common designation networks, such as class-based networks.

Another principal aspect of the invention of the present application comprises a data communication network comprising at least two logically distinct class-based networks conjoined by at least one common node that has membership in each of the respective classes of the two logically distinct class-based networks.

Additional features of the foregoing principle aspects also are set forth elsewhere herein. In addition to the aforementioned aspects and features of the present invention, it should be noted that the present invention further encompasses the various possible combinations and subcombinations of such aspects and features.

BRIEF DESCRIPTION OF THE DRAWINGS

One or more preferred embodiments of the present invention now will be described in detail with reference to the accompanying drawings, wherein the same elements are referred to with the same reference numerals, and wherein.

DETAILED DESCRIPTION

Figure 1:
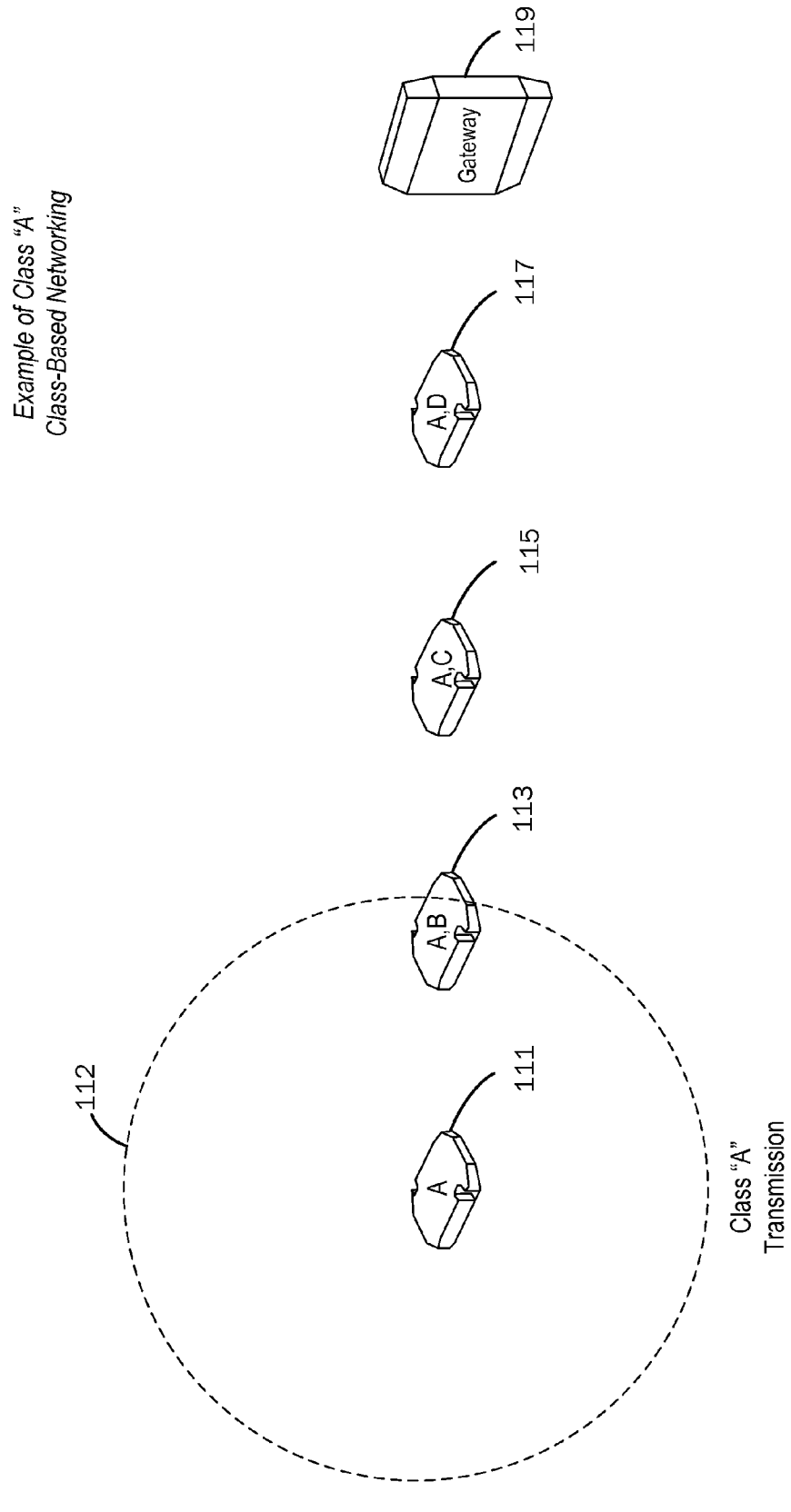
FIGS. 1-4 illustrate a first plurality of remote sensor nodes and a gateway.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

FIG. 1 illustrates a data communications network in accordance with one of many different preferred embodiments of the present invention. The network includes a gateway and a plurality of wireless data communication devices comprising remote sensor nodes (sometimes referred to, and hereinafter, "RSN", "RSN" or simply "node").

RSNs 111, 113, 115, 117 are shown in FIGS. 1-4 together with a gateway 119. As illustrated, each RSN 111, 113, 115, 117 lies within a transmission range (represented by the dashed circles in the figures) of each immediately adjacent RSN; RSN 117 lies within a transmission range of the gateway 119; and gateway 119 lies within a transmission range of RSN 117. The RSNs 111, 113, 115, 117 are configured for class-based communications, and the classes of the RSNs 111, 113, 115, 117 are illustrated in these FIGS. 1-4. Specifically, RSN 111 is a member of class "A"; RSN 113 is a member of class "A" and class "B"; RSN 115 is a member of class "A" and "C"; RSN 117 is a member of class "A" and class "D". Additionally, in this example, none of these classes "A", "B", "C" or "D" is deemed to be a subset or superset of any of the other classes. The gateway 119 preferably is configured to communicate with any members of these classes.

Figure 2:
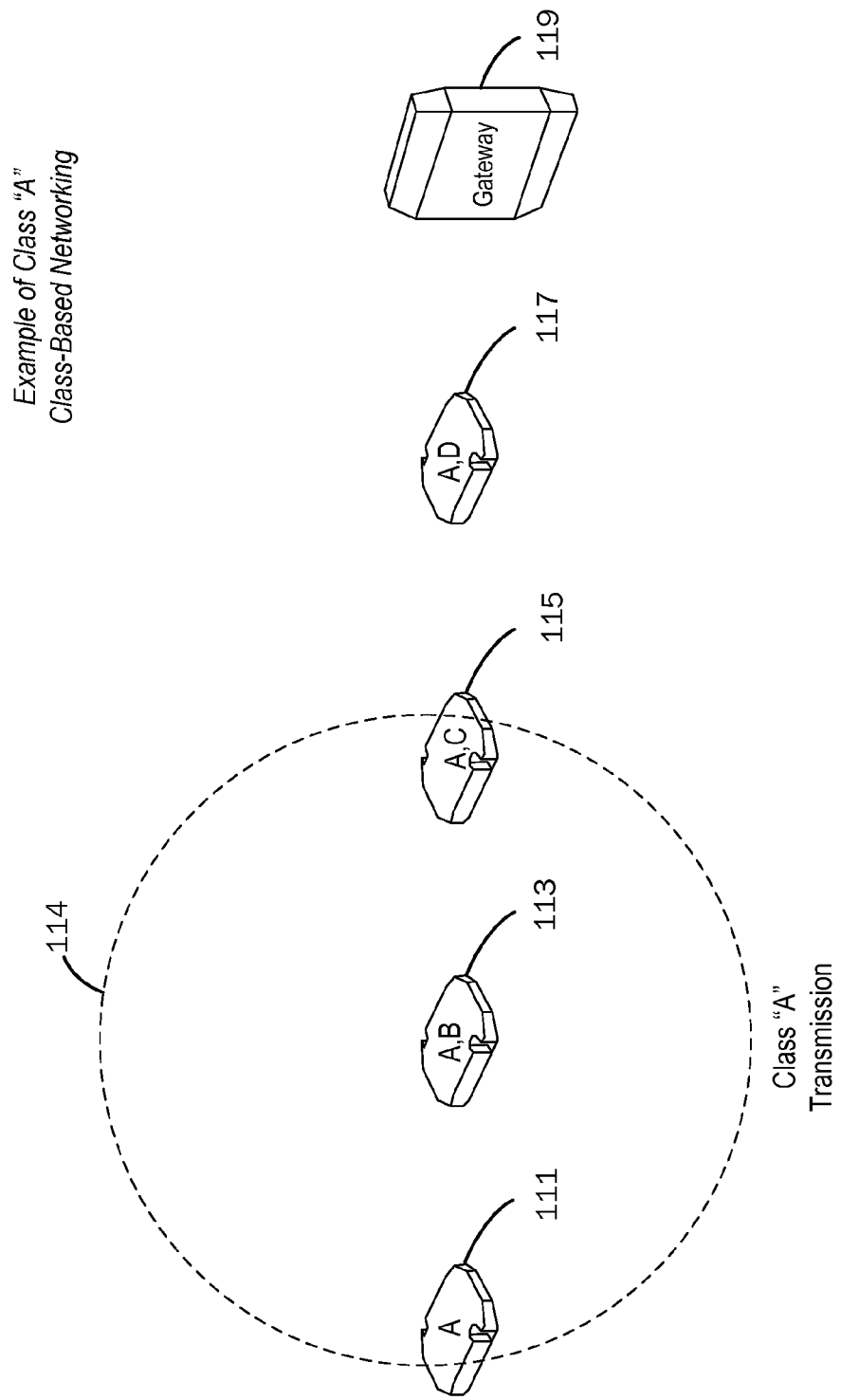
Figure 3:
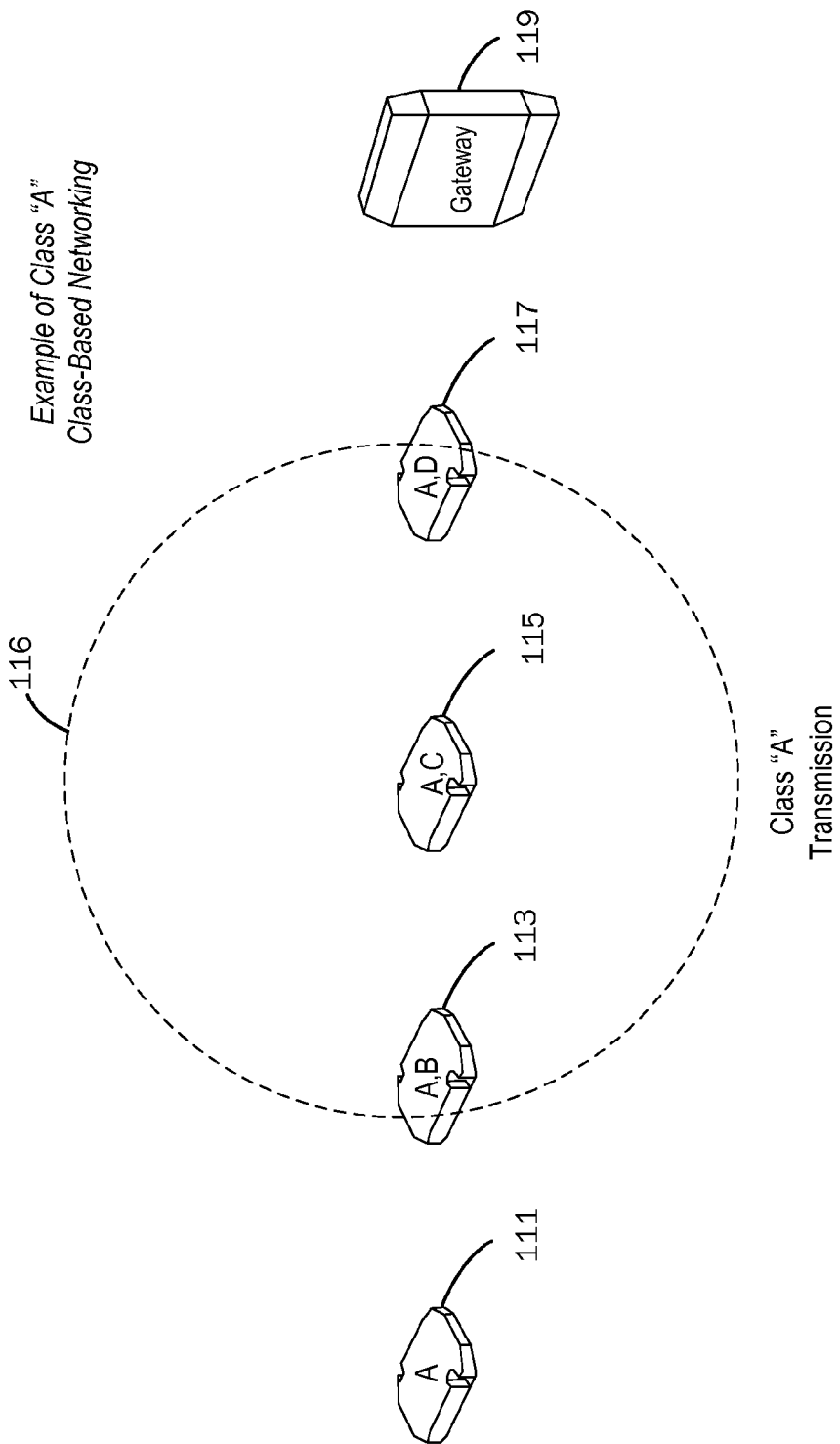
Figure 4:
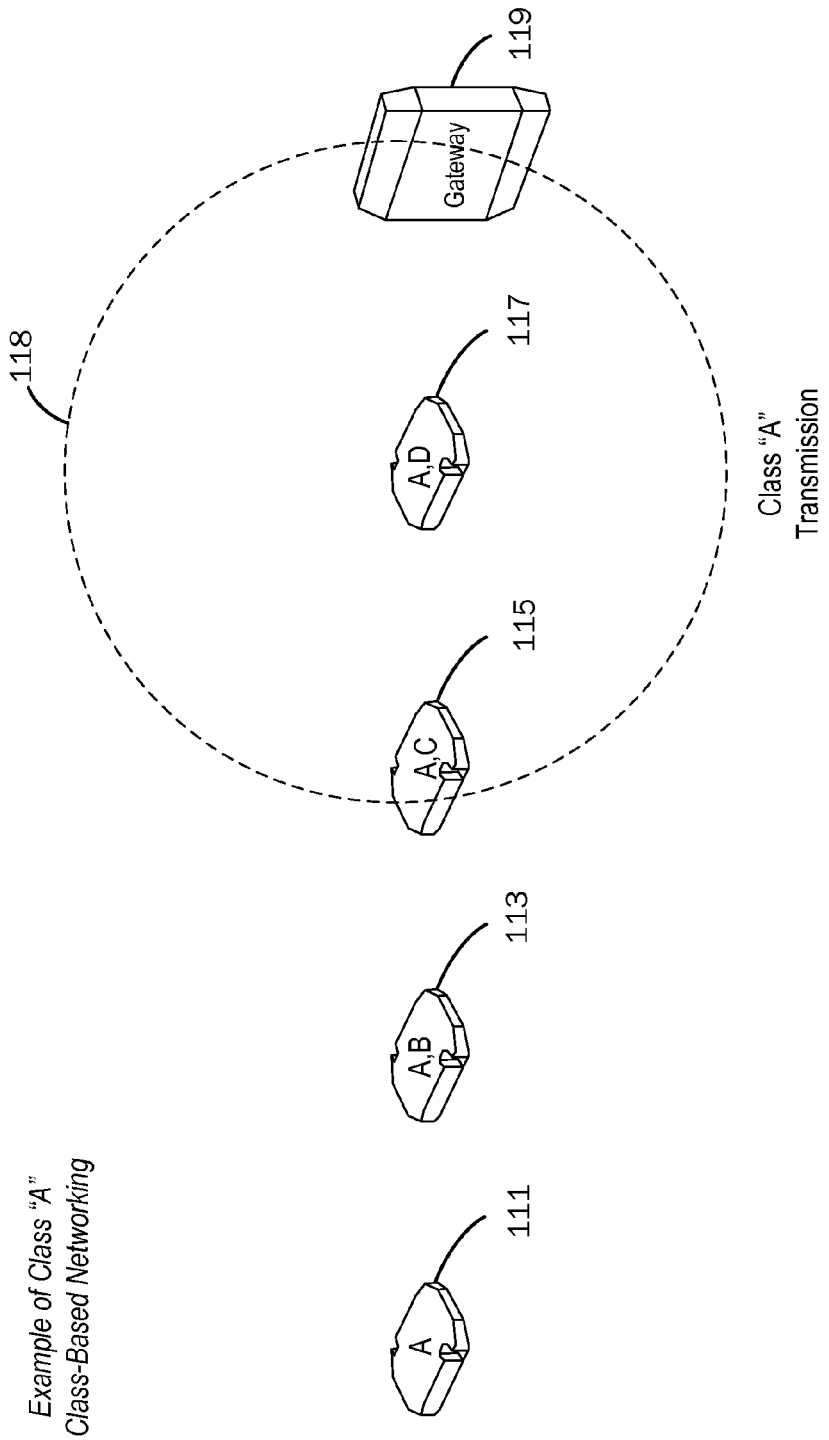
Figure 5:
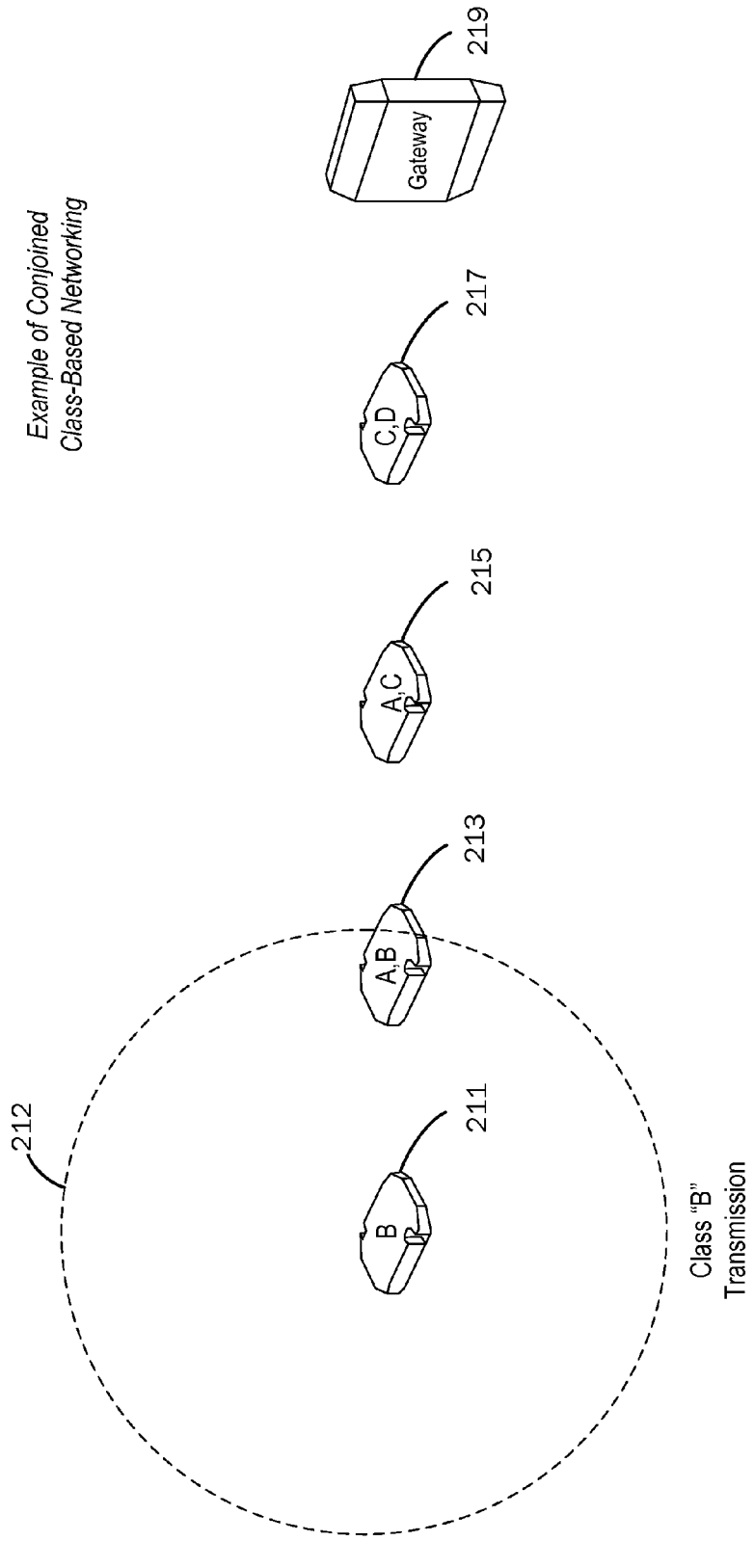
FIGS. 5-8 illustrate a second plurality of remote sensor nodes and a gateway.
Figure 6:
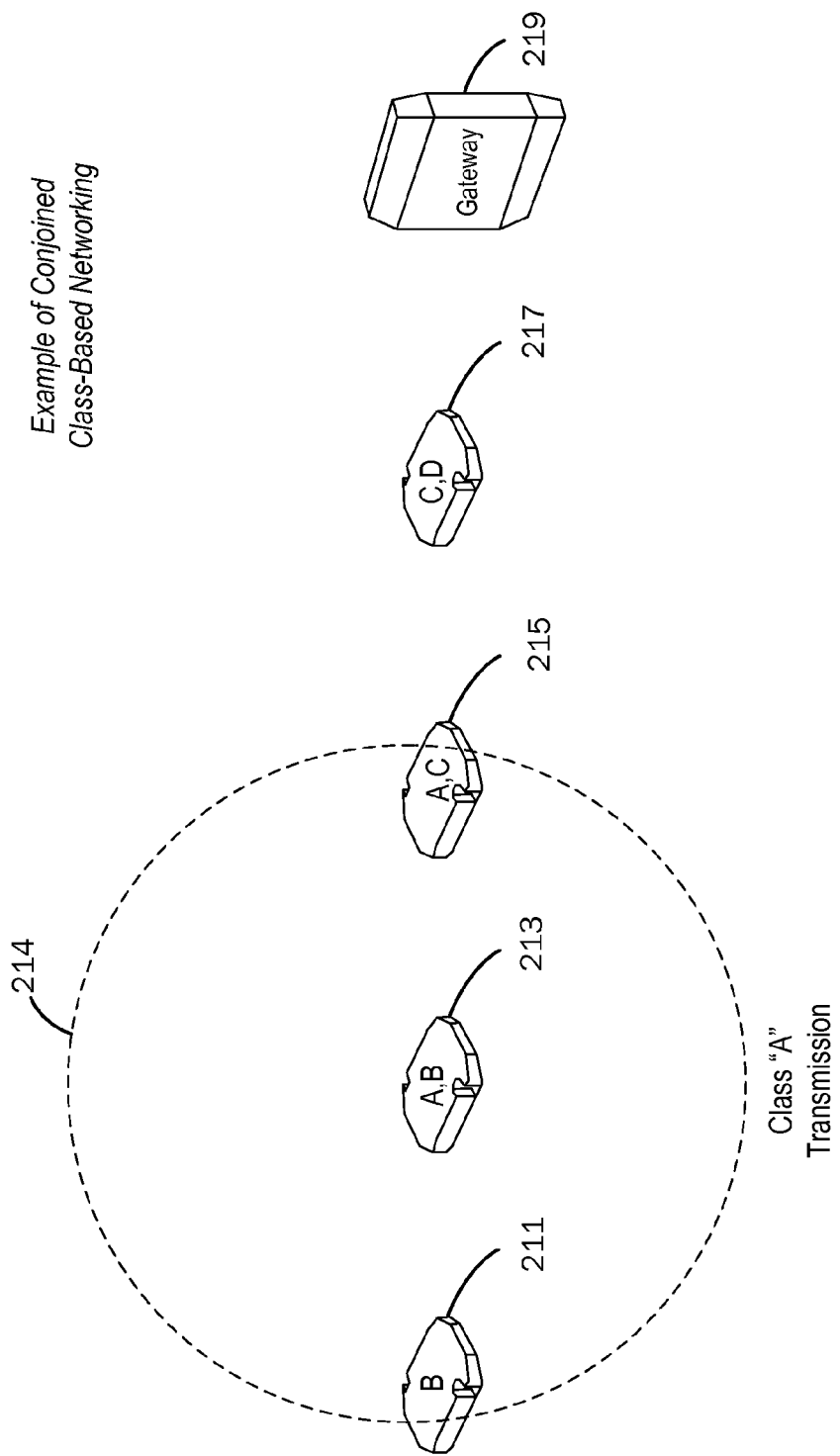
Figure 7:
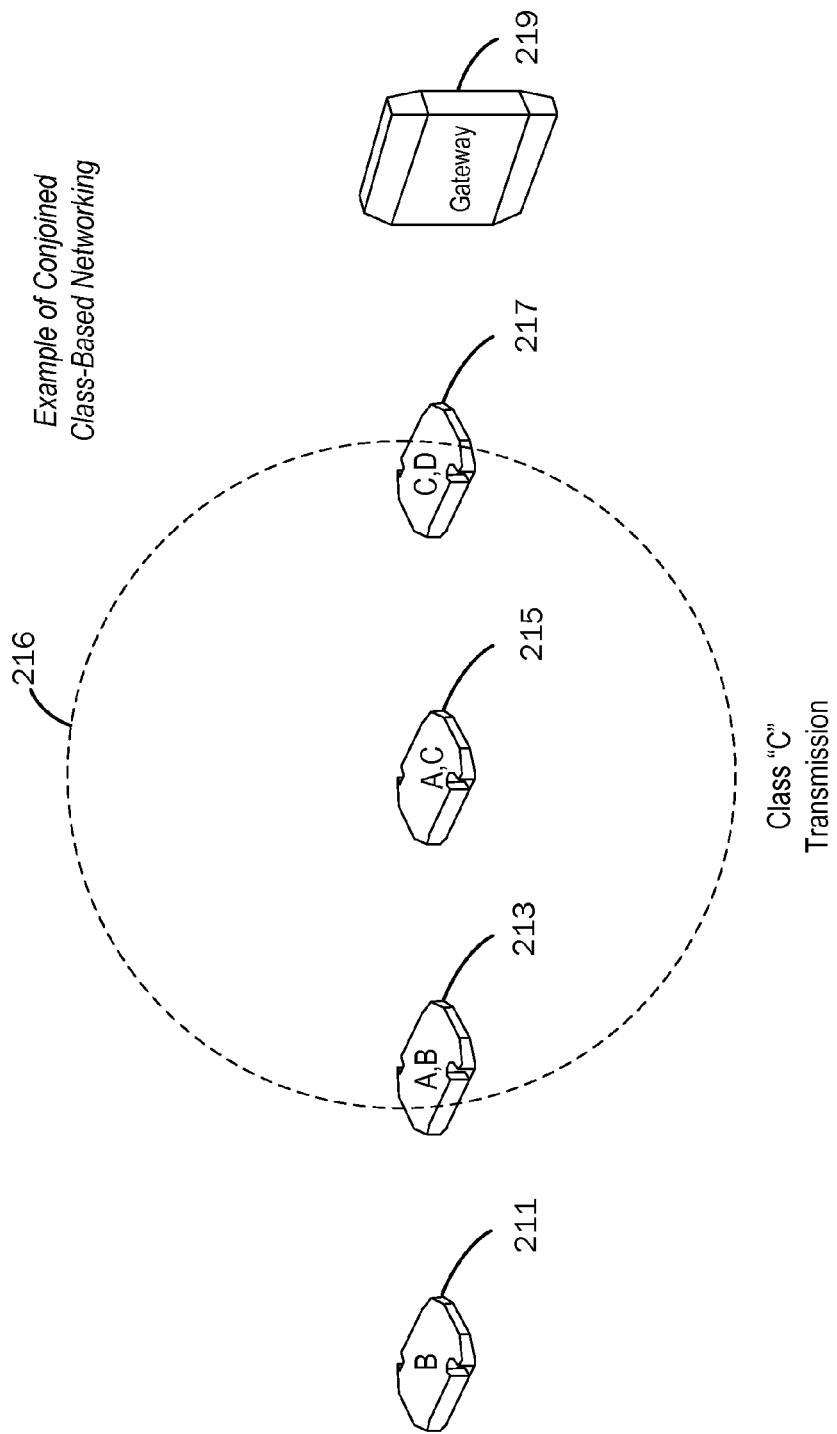

In accordance with a first class-based networking protocol, as more fully described for example in incorporated U.S. Pat. Nos. 6,745,027; 6,934,540; 7,200,132; 7,209,468; and 7,221, 668, the RSNs 111, 113, 115, 117 are configured to form class-based networks based on class memberships. As will be appreciated, because all of the RSNs 111, 113, 115, 117 are members of the same class "A", these RSNs form a class "A" communications network by which RSN 111 communicates with the gateway 119 by hopping a message along RSNs 113, 115, 117, as shown in FIGS. 1-3, with RSN 117 communicating the message originated by RSN 11 to the gateway 119, as shown in FIG. 4. In this sequence of communications, each RSN 111, 113, 115, 117 makes a respective class "A" transmission 112, 114, 116, 118, as represented in FIGS. 1-4.

In contrast to the class-based networking illustrated in FIGS. 1-4, a different networking protocol is now described with reference to FIGS. 5-8. In these figures, RSNs 211, 213, 215, 217 are shown in FIGS. 5-8 together with a gateway 219. Each RSN 211, 213, 215, 217 lies within a transmission range (represented by the dashed circles in the figures) of each immediately adjacent RSN; RSN 217 lies within a transmission range of the gateway 219; and gateway 219 lies within a transmission range of RSN 217. The classes of the RSNs 211, 213, 215, 217 are illustrated in FIGS. 17-20. Specifically, RSN 211 is a member of class "B"; RSN 213 is a member of class "A" and class "B"; RSN 215 is a member of class "A" and "C"; RSN 217 is a member of class "C" and class "D". Additionally, in this example, none of these classes is deemed to be a subset or super set of any of the other classes, and the gateway 219 preferably is configured to communicate with any members of these classes.

In accordance with a the networking protocol illustrated in FIGS. 5-8, the RSNs 211, 213, 215, 217 are configured to form networks comprising separate and distinct class-based networks that are conjoined by RSNs that are members of more than one of the classes. In this respect, the RSNs that are members of more than one class (i.e., RSNs 213, 215, 217) communicate class-based messages of a particular class via class-based networks of a different class, in which the RSN is a member, when class-based communications within the class of the incoming transmission are unavailable. These RSNs having multiple memberships thereby serve as communications bridges between—and that conjoin—otherwise logically distinct class-based communication networks. Such a network is referred to herein as a "Conjoined Class-Based Network" and such type of networking protocol is referred to herein as "Conjoined Class-Based Networking".

Figure 8:
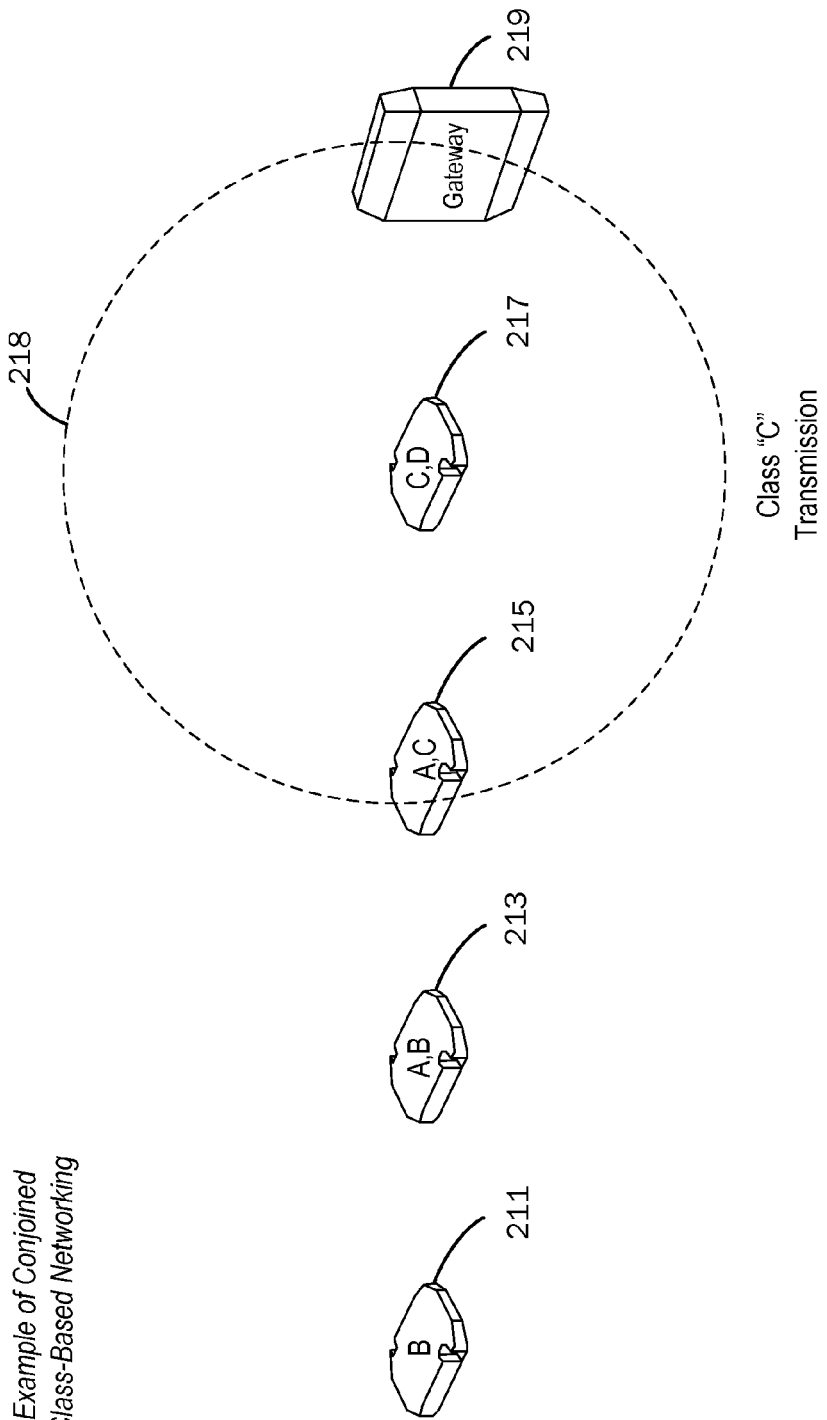

Specifically, RSN 211 communicates a message by making a class "B" transmission 212, which is received and processed by RSN 213, which also is a member of class "B". RSN 213, however, is unable to further communicate the message within a class "B" network, as no other intermediate RSN of class "B" is within transmission range for communicating with the gateway 219. Nevertheless, RSN 213 is a member of class "A" and therefore communicates the message by making a class "A" transmission 214, which is received and processed by RSN 215, which also is a member of class "A". RSN 215 is unable to further communicate the message within a class "A" network, as no other intermediate RSN of class "A" is within transmission range for communicating with the gateway 219. Nevertheless, RSN 215 is a member of class "C" and therefore communicates the message by making a class "C" transmission 216, which is received and processed by RSN 217, which also is a member of class "C". RSN 215, which is within transmission range with gateway 219, then communicates the message to gateway 219 by making a class "C" transmission 218 as shown in FIG. 8.

As will be appreciated, by utilizing a network comprised of distinct and separate class-based networks joined by common RSNs having membership in two or more of the classes, RSN 111 is able to send a message to the gateway 119 (and on to an external network if applicable via the gateway 119) when class "B" networking to the gateway 119 is unavailable.

The message may be any message, such as a check-in message, a message communicating an alert, or a message responding to an inquiry. Additionally, the networking may include deterministic or nondeterministic networking, as set forth in incorporated USPA Publ. No. 2007/0002792.

In variations, each RSN may be configured in a first state in which such conjoined class-based networking is enabled; in a second state in which such conjoined class-based networking is disabled; and may be configurable between the two states based on detection of a condition, based on receipt of a command, based on predetermined times, or any of the foregoing. Moreover, an RSN may be configured for conjoined class-based networking for certain classes, but not for all classes, whereby excluded class-based networks do not participate in the conjoined class-based networks.

Also, as will be appreciated, in conjoined class-based networking, class commonality or class continuity is required only for each hop between RSNs, and not for every RSN along the pathway from the originating RSN to the gateway (or similarly to a destination RSN if the message is not intended for communication to or through a gateway).

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A wireless two-way RF data communication device, comprising:
   (a) a memory having stored therein common designations of the wireless two-way RF data communication device;
   (b) a receiver configured to receive radio frequency transmissions;
   (c) a transmitter configured to make radio frequency transmissions; and
   (d) electronic components arranged and configured,
      (i) such that the wireless two-way RF data communication device receives and processes communications as a function of at least one of the common designations of the wireless two-way RF data communication device being in the communication, and
      (ii) such that each message that is received in a communication associated with a particular common designation of the RF data communication device, and for which the wireless two-way RF data communication device is not the destination recipient but, instead, is an intermediate recipient, is communicated,
         (A) to another wireless two-way RF data communication device that has the same particular common designation, if such a wireless two-way RF data communication device is available, and
         (B) if such a wireless two-way RF data communication device is unavailable, to another wireless two-way RF data communication device that has a common designation that is the same as a common designation stored in the memory, if such a wireless two-way RF data communication device is available;
   (e) wherein the electronic components are arranged and configured such that the wireless two-way RF data communication device selectively operates between at least a first state, in which the communications provided in (d)(ii)(B) are enabled, and in a second state, in which the communications provided in (d)(ii)(B) are disabled.

2. The wireless two-way RF data communication device of claim 1, wherein the common designations stored in the memory are class designations for use in class-based networks.

3. The wireless two-way RF data communication device of claim 1, wherein the electronic components are arranged and configured such that the wireless two-way RF data communication device receives and processes only communications that include at least one of the common designations of the wireless two-way RF data communication device.

4. The wireless two-way RF data communication device of claim 1, wherein the electronic components are arranged and configured such that the communications provided in (d)(ii)(B) are performed only for predetermined common designations and not for all common designations.

5. A data communications network, comprising:
(a) a plurality of wireless two-way radio frequency (RE) data communication devices, each wireless two-way RF data communication device forming a node of the data communications network and each wireless two-way RF data communication device including a memory having stored therein a common designation;
(b) wherein at least one of the wireless two-way RF data communication devices further includes a second common designation stored in the memory thereof and comprises,
  (i) a receiver configured to receive radio frequency transmissions,
  (ii) a transmitter configured to make radio frequency transmissions, and
  (iii) electronic components arranged and configured,
    (A) such that the wireless two-way RF data communication device receives and processes communications as a function of at least one of the common designations of the wireless two-way RF data communication device being in the communication, and
    (B) such that each message that is received in a communication associated with a particular common designation of the RF data communication device, and for which the wireless two-way RF data communication device is not the destination recipient but, instead, is an intermediate recipient, is communicated,
      (I) to another wireless two-way RF data communication device that has the same particular common designation, if such a wireless two-way RF data communication device is available, and
      (II) if such a wireless two-way RF data communication device is unavailable, to another wireless two-way RF data communication device that has a common designation that is the same as a common designation stored in the memory, if such a wireless two-way RF data communication device is available;
(c) wherein the electronic components of the at least one of the wireless two-way RF data communication devices are arranged and configured such that the wireless two-way RF data communication device selectively operates between at least a first state, in which the communications provided in (b)(iii)(B)(II) are enabled, and in a second state, in which the communications provided in (b)(iii)(B)(II) are disabled.

6. The data communications network of claim 5, wherein the first and second common designations stored in the memory of the at least one of the wireless two-way RF data communication devices are class designations for use in class-based networking.

7. The data communications network of claim 5, wherein the electronic components of the at least one of the wireless two-way RF data communication devices are arranged and configured such that the communications provided in (b)(iii)(B)(II) are performed only for predetermined common designations and not for all common designations.

8. The data communications network of claim 5, wherein the information is wirelessly communicated in data packets in the data communications network.

9. The data communications network of claim 5, wherein a plurality of the wireless two-way RF data communication devices are respectively attached to assets for monitoring and tracking of the asset.

10. The data communications network of claim 5, wherein a plurality of the wireless two-way RF data communication devices are permanently affixed to a structure for monitoring and/or tracking assets that come within a proximity thereto.

11. In a data network comprising a plurality of wireless two-way radio frequency (RE) data communication devices, each wireless two-way RF data communication device forming a node of the data communications network, a method of communicating a message from an originating node to a destination node by way of intermediate nodes, the method comprising the steps of:
(a) maintaining multiple class designations in memory of a particular one of the wireless two-way radio frequency (RE) data communication devices forming a node of the network; and
(b) for each message that is received by the particular wireless two-way radio frequency (RE) data communication device in a communication associated with a common designation of the particular wireless two-way radio frequency (RE) data communication device, and for which the particular wireless two-way RF data communication device is an intermediate node with respect to the message, forwarding the message,
  (i) to another node of the network that has the same particular common designation associated with the message, if such another node is available, and
  (ii) if such another node is unavailable, to another node that has a common designation that is the same as a common designation stored in the memory of the particular wireless two-way radio frequency (RF) data communication device, if such a node is available,
(c) wherein the method further comprises switching between at least two states of operation by the particular wireless two-way RF data communication device, wherein said step (b)(ii) is not performed in the second state.

12. The method of claim 11, wherein the particular wireless two-way radio frequency (RF) data communication device receives and processes communications as a function of at least one of the common designations of the particular wireless two-way RF data communication device being in the communication.

13. The method of claim 11, wherein the first and second common designations stored in the memory of the particular wireless two-way RF data communication device are class designations for use in class-based networking, the particular wireless two-way RF data communication device conjoining at least two logically distinct class-based networks.

14. The method of claim 11, wherein said step (b)(ii) is performed only for predetermined common designations and not for all common designations.

15. The method of claim 11, wherein the particular wireless two-way RF data communication device switches between the first and second state in response to a command that is received by the particular wireless two-way RF data communication device in a wireless communication.

16. The method of claim 11, wherein the particular wireless two-way RF data communication device switches between the first and second state in response to a sensed condition.

17. The method of claim 11, wherein the particular wireless two-way RF data communication device switches between the first and second state at predetermined times.

\* \* \* \* \*